(12) United States Patent
Krietzman

(10) Patent No.: US 11,416,515 B2
(45) Date of Patent: Aug. 16, 2022

(54) TRACK AND TRACE VAPORIZERS AND CARTRIDGES

(71) Applicant: Mark Krietzman, Palos Verdes Estates, CA (US)

(72) Inventor: Mark Krietzman, Palos Verdes Estates, CA (US)

(*) Notice: Subject to any disclaimer, the term of this patent is extended or adjusted under 35 U.S.C. 154(b) by 584 days.

(21) Appl. No.: 16/513,591

(22) Filed: Jul. 16, 2019

(65) Prior Publication Data

US 2020/0046030 A1 Feb. 13, 2020

Related U.S. Application Data

(60) Provisional application No. 62/698,429, filed on Jul. 16, 2018.

(51) Int. Cl.
G06F 16/27 (2019.01)
G06K 19/077 (2006.01)

(52) U.S. Cl.
CPC ....... *G06F 16/27* (2019.01); *G06K 19/07758* (2013.01)

(58) Field of Classification Search
None
See application file for complete search history.

(56) References Cited

U.S. PATENT DOCUMENTS

| 10,982,899 | B1* | 4/2021 | Gelardi | B01D 45/16 |
| 2019/0195852 | A1* | 6/2019 | Bryant, Jr. | G01N 33/948 |
| 2019/0373679 | A1* | 12/2019 | Fu | G08B 6/00 |
| 2021/0401061 | A1* | 12/2021 | Davis | A24F 40/42 |

* cited by examiner

*Primary Examiner* — Kristy A Haupt
(74) *Attorney, Agent, or Firm* — Mark Krietzman

(57) ABSTRACT

Disclosed herein are devices and methods for the selective tracing of *Cannabis* containing vaporizer cartridge through their lifecycle. A permanently a radio frequency identifier (RFID) that is near field communication (NFC) compatible is associated with a vaporizer cartridge having an assigned a unique identifier tag (UIT) and, utilizing a blockchain platform to allow each node in the supply and distribution chain to ledger and in their block of data to the NFC RFID of their transaction.

3 Claims, 6 Drawing Sheets

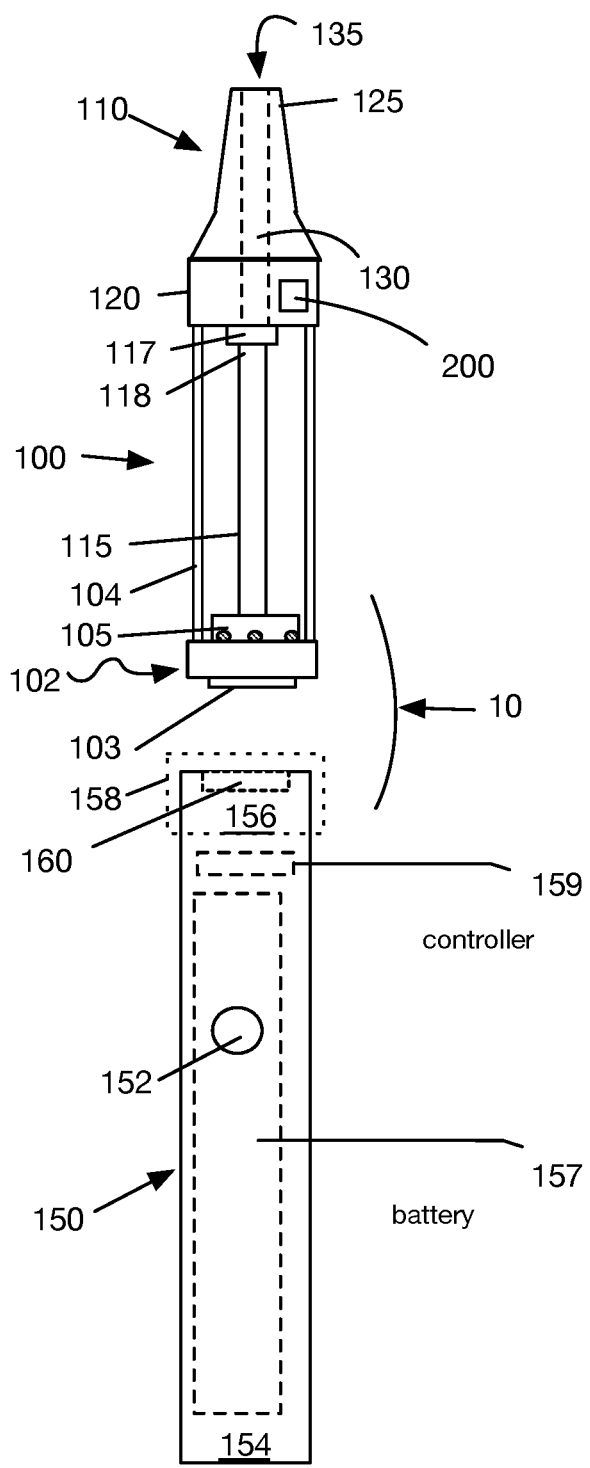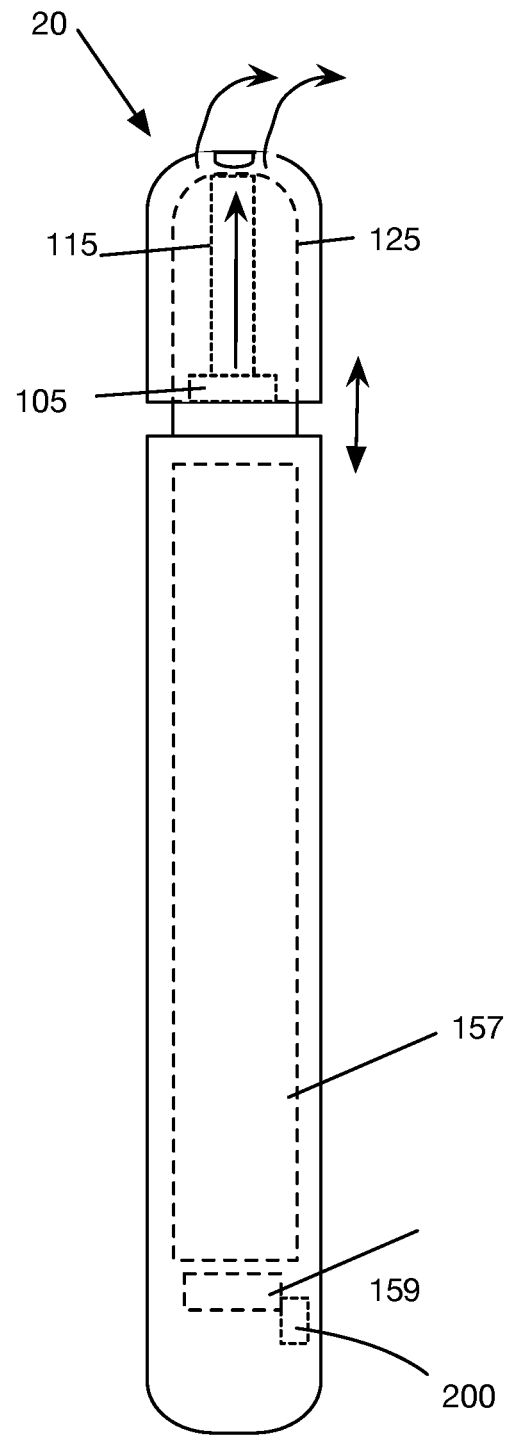
FIG. 1A
FIG. 1B

TRACK AND TRACE VAPORIZERS AND CARTRIDGES

RELATED APPLICATION

This application claims the benefit of Applicant's United States ("U.S.") Provisional Patent Application Ser. No. 62/698,429 filed Jul. 16, 2018 entitled "TRACK AND TRACE VAPORIZER CARTRIDGES" the entirety of which are both incorporated by reference herein in as if set forth in their entirety.

BACKGROUND OF THE DISCLOSURE

Field of the Disclosure

The present disclosure relates generally to trace and track of extract used in *Cannabis* vaporizer cartridges.

Background

Vaporizers for many essential oils have become common place. The range of aromatherapy oils is very large with different oils vaporizing at different temperatures. These devices may be a simple as inhale and a battery supply immediately heats a coil or other heating element to heat the oil and produce vapor. Other device may require a sequence of button pushing or switch flipping.

*Cannabis* extracted oils are also commonly found in such cartridges. *Cannabis sativa* contains over 421 different chemical compounds, including over 60 cannabinoids. Cannabinoid plant chemistry is far more complex than that of pure THC, and different effects may be expected due to the presence of additional cannabinoids and other chemicals. Eighteen different classes of chemicals, including nitrogenous compounds, amino acids, hydrocarbons, carbohydrates, terpenes, and simple and fatty acids, contribute to the known pharmacological properties of *Cannabis*.

*Cannabis*, for example has a narrow range at which it can be heated to release "THC" (Tetrahydrocannabinol (THC), or more precisely its main isomer (−)-trans-$\Delta^9$-tetrahydrocannabinol) and CBDs (Cannabidiol loosely referring to as many as 85 identified compounds in *Cannabis*) chemicals as vapor without burning the organic material and adding non-THC and CBD material to the inhalation gases.

Children are curious and will imitate adult use or simple explore. It is therefore a desideratum to have child resistant vaporizer. Safety concerns and governmental regulations benefit if said cartridges and the contents thereof are traceable to sources. Therefore is therefore a desideratum to traceable cartridges.

DISCLOSURE

In the following description of examples of implementations, reference is made to the accompanying drawings that form a part hereof, and which show, by way of illustration, specific implementations of the present disclosure that may be utilized. Other implementations may be utilized and structural changes may be made without departing from the scope of the present disclosure.

Vaporizer batteries, control circuits and the like are known. This disclosure should be interpreted broadly and is a mechanical solution for a plethora of vaporizer devices to discourage, frustrate or prevent child use. Title 16 of the Code of Federal Rules (CFR) 1700.15 describes safety packaging for poisons and the need for child resistant packaging. That governmental code is hereby referenced and incorporated by this reference as if fully set forth herein. In relevant part is sets standards to prevent accidental or misuse by children. It also has specific guideline for aerosols.

Aspects of methods, systems and device disclosed herein for vaporizing *Cannabis* include a vaporizer tip having a body, a fluid pathway therethrough, a connection end configured to connect to a cartridge; an inhalation end with an outlet fluidly connected to the fluid pathway; and, a radio frequency identification (RFID) chip or tag affixed thereto. The RFID chip is configured to provide at least one of cartridge identification via a unique identifier, ledger data and records. The cartridge may be used as part of a near field communication (NFC) blockchain system and/or a signal communication system through networks. In some instances, the tip further comprises a selective vapor blocking cap affixed to the tip. In some instances the body comprises an inner core and an outer encasement; and the RFID chip or tag is placed within the inner core. In some instances the body comprises an inner core and an outer encasement; and the RFID chip or tag is placed within the outer encasement.

Aspects of methods, systems and device disclosed herein for tracing and tracking compliance and safety of *Cannabis* extract containing cartridges, the method includes permanently a radio frequency identifier (RFID) means to a vaporizer cartridge; assigning a unique identifier tag (UIT) to the RFID and associated cartridge; and, creating a database which contains at least one of manufacturing and distribution records. In some instances the compliance data including but not limited to child safety certifications and testing, chemical testing, supply chain. In some instances a radio frequency identifier (RFID) means is affixed to a vaporizer cartridge and assigning a unique identifier tag (UIT) associated cartridge; and, utilizing a blockchain platform to allow each node in the manufacturing, testing and/or distribution sequence to chain in sequence their block of transaction data onto the RFID associated with the cartridge. In some instances compliance data including but not limited to child safety certifications and testing, chemical testing, supply chain is included.

FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 1A is an component view of a pen type vaporizer with replaceable extract media holding cartridge.

FIG. 1B is a disposable pen vaporizer for extract with fixed extract media holder.

Figure 2A:
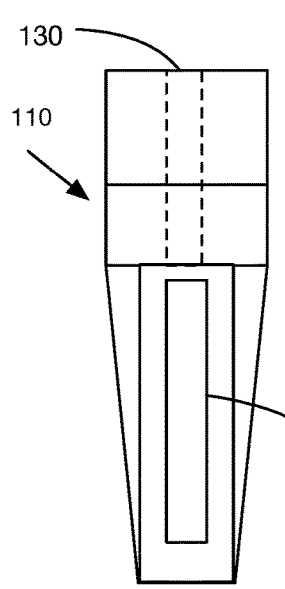
FIGS. 2A-2F illustrates aspects of vaporizer tips with RFID.
Figure 2C:
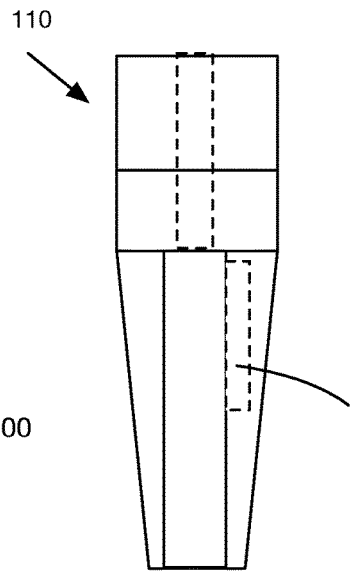
Figure 2E:
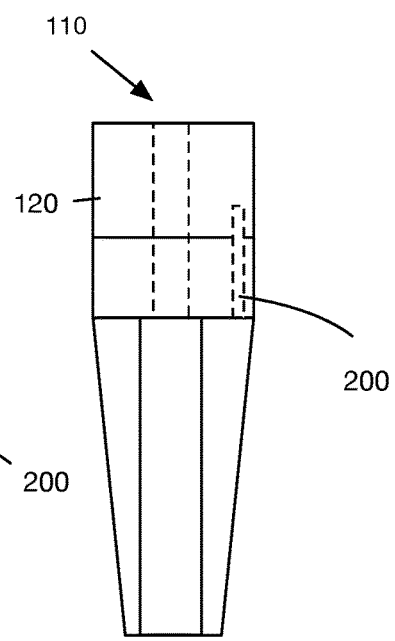
Figure 2B:
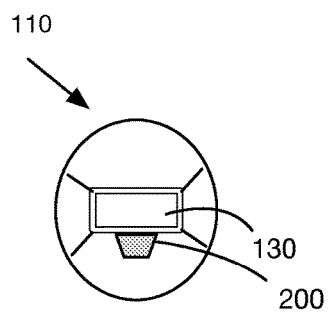
Figure 2D:
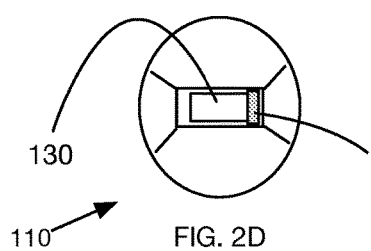
Figure 2F:
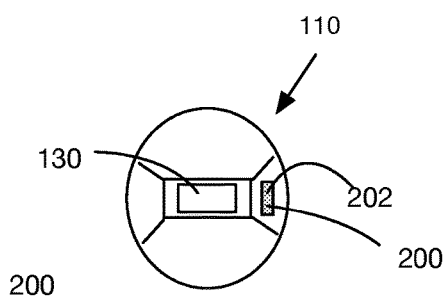

All descriptions and callouts in the Figures and all content therein are hereby incorporated by this reference as if fully set forth herein.

FURTHER DISCLOSURE

Compliance and safety are properly at the heart of the emerging *Cannabis* industry. Better lifecycle trace and track is needed. Extracts prepackaged in cartridges which are used to vaporize same are one means of *Cannabis* use. Such cartridges are subject to regulations.

Blockchain is a technology which allows data to be distributed but not copied, blockchain technology created the backbone. Each block in the blockchain has the Merkle root of its transactions and the hash of its previous block. The hash of Merkle root can be used as a definitive mechanism to verify the integrity of the block as even the slightest changes to any of the records in this tree will alter the value of the original Merkle Root.

Each node in the blockchain network gets a copy of the blockchain and may add its ledger data to the chain but not alter prior entries. by utilizing the disclosed trace and track blockchain vaporizer cartridges from production to delivery or use by end user can be verified. This increased supply chain transparency provides data which may be used concerning content of products, testing, or safety of products, to reduce fraud and counterfeit products, and to complete compliance by manufacturers and distributors.

Moreover, opt-in consumers having credentials to show their place on the blockchain can receive rewards for entering their blockchain data. All blockchain actions are complete via computing devices having processors which access a network. A significant advantage of this proposed blockchain-based workflow is in the increased traceability that it provides, since the physical goods are monitored from the beginning of the supply chain via the Digital ID validation series. Each identified quantity of goods represents an immutable timestamped record that may be recalled in case of dispute and litigation. Blockchain immutability and traceability are key functional attributes for improving efficiency in the supply chain process of tracking the change of ownership of goods. The blockchain must allow every participant on a supply chain network to track sourcing and origin of materials but also maintain immutable records of the production and storage of finished goods.

It is appreciated by those skilled in the art that some of the circuits, components, controllers, computing devices, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs"), time-to-frequency conversations, frequency-to-time conversions, database mapping, signal processing steps, coding, modulations, demodulations, etc. The controller devices and smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), additional memory may be added, application specific integrated circuit ("ASIC"), field programmable gate array ("FPGA"), microprocessor, etc. Alternatively, portions DCA devices may also be or include hardware devices such as RFID, NFC and logic circuitry, a CPU, a DSP, ASIC, FPGA, etc. and may include hardware and software capable of receiving and sending information.

Disclosed herein are aspects of devices, methods and systems of trace and track cartridge modules for an electronic vaporizer cartridge.

FIG. 1A illustrates a traditional vaporizer system 10 with replaceable cartridge 100. Body 150 containing a power supply 157 and controller (159) with an on/off switch 152 accessible on the body a distal end 154 and a proximal end 156. The power supply, controller and on/off switch are configured to be in signal communication with each other. A cartridge interface 158 is configured at one end to mount to the replaceable cartridge 100. Cartridges are shown as linear but those of ordinary skill in the art will recognize that a squat or square cartridge with a inhalation outlet is also within the scope of this disclosure. The cartridge has a first end 102 configured to mate with the cartridge interface 158. At the first end is a power connection 103 configured to electrically connect to the power coupling 160 on the body. The interface connection may be friction fit or preferably via threaded fitting.

A cylindrical tube 104 is connected to the first end on the opposite side as the power connection 103. Within the cylindrical tube is an electrical heating element 105 containing a heater and connected to a vapor pathway 115 which may have a tip gasket 117 at its tip connection end 118. The tip has a distal end 120 which connects with the connection end of the fluid pathway and with the tube 104 and it has a proximal end 125. A vapor outlet 130 is formed axially in the tip from the distal end to the proximal end and is configured to connect to the vapor pathway to form a fluid pathway from the cartridge heater to an inhalation port 135 at the top of the proximal end of the tip. A radio frequency identification chip or tag with an antenna (RFID) 200 is affixed permanently to the cartridge. Preferably to the tip of the cartridge. The RFID is preferable passive and NFC (near field communication).

RFID tags contain an antenna and a memory chip that stores data. NFC technology operates at a relatively narrow range generally of inches and can also be set up for one- or two-way communications. A computing device which includes or smartphones which are NFC compatible act as a NFC writer or reader depending on the RFID tag and computing device software etc. Passive RFID tags have no power. They're activated by an electromagnetic signal sent from the RFID reader (as described above which may be a computing device such as a smartphone, tablet or a dedicated reader/writer). The signal doesn't travel as far as active RFID, so they're used for short read ranges. Passive RFID falls into one of three frequency ranges:

Low frequency: 125-134.2 kHz;
High frequency: 13.56 MHz;
Ultra-high frequency: 856-960 MHz.

NFC is however based on RFID protocols. The devices run at passive RFID's high frequency. The NFC protocol can have two-way communication—unlike RFID's one-directional limitation—using one of two modes: card emulation and peer-to-peer (P2P). For example, a smartphone enabled with NFC can pass information back and forth to another NFC device. Contactless payment is an example of card emulation mode. NFC protocols are suited for some blockchain transaction.

FIGS. 2A-2F illustrate aspects of non-limiting examples placement options of the RFID 200 within the tip 110 of vaporizer cartridge. Each placement is by at least one of co-molding into an injection molded tip, placement within a pocket or catch 202 and adhesion onto the inner wall of the fluid pathway 130 or to the external region of the tip (FIG. 2A). herein are aspects of devices, methods and systems of tracing and tracking vaporizer cartridges and safety devices and data associated therewith.

Figure 3A:
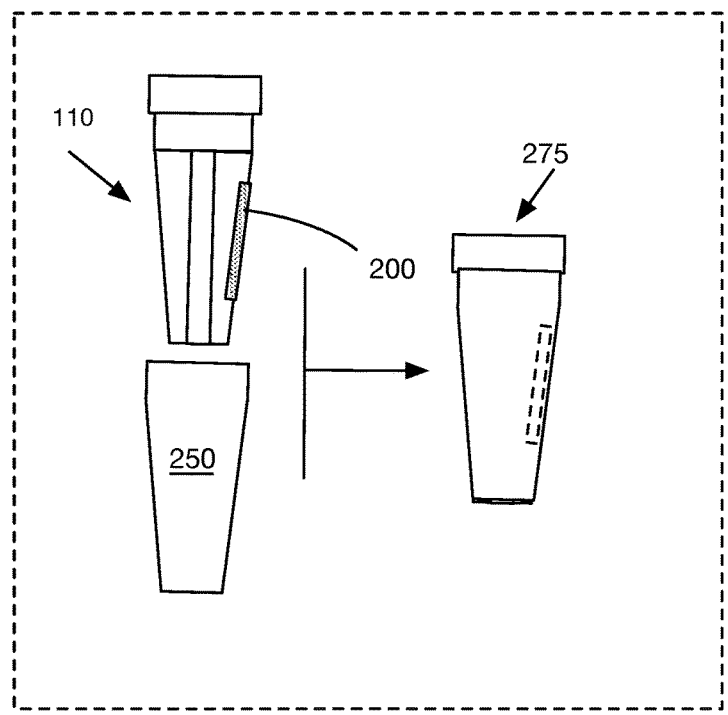
FIGS. 3A and 3B illustrate a tip with a surface mount RFID.
Figure 3B:
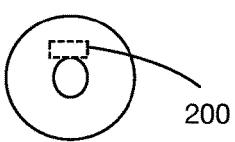

FIGS. 3A and 3B illustrate a tip with a surface mount RFID 200. A cap or cover (which may be a child protective cap). The cap 250 in its simplest form is a cover that is affixed over the tip and essentially forms a multi-layer tip 275. The cap will protect the RFID and prevent tampering. The simplest version of the cap and tip are aligned to ensure the fluid path 130 is not blocked. In a child resistant exemplar the cap moves up and down axial along the tip moving a plunger in and out of the fluid pathway. Said cap is force limited and requires a predetermined amount of force to move the cap upward to open the fluid pathway.

Figure 4:
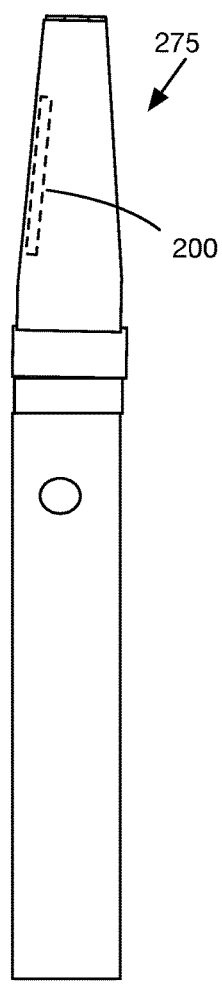
FIG. 4 illustrates a vaporize pen device with cartridge and RFID.

FIG. 4 illustrates a vaporize pen device with cartridge and RFID trace/track for blockchain and other trace applications.

Figure 5:
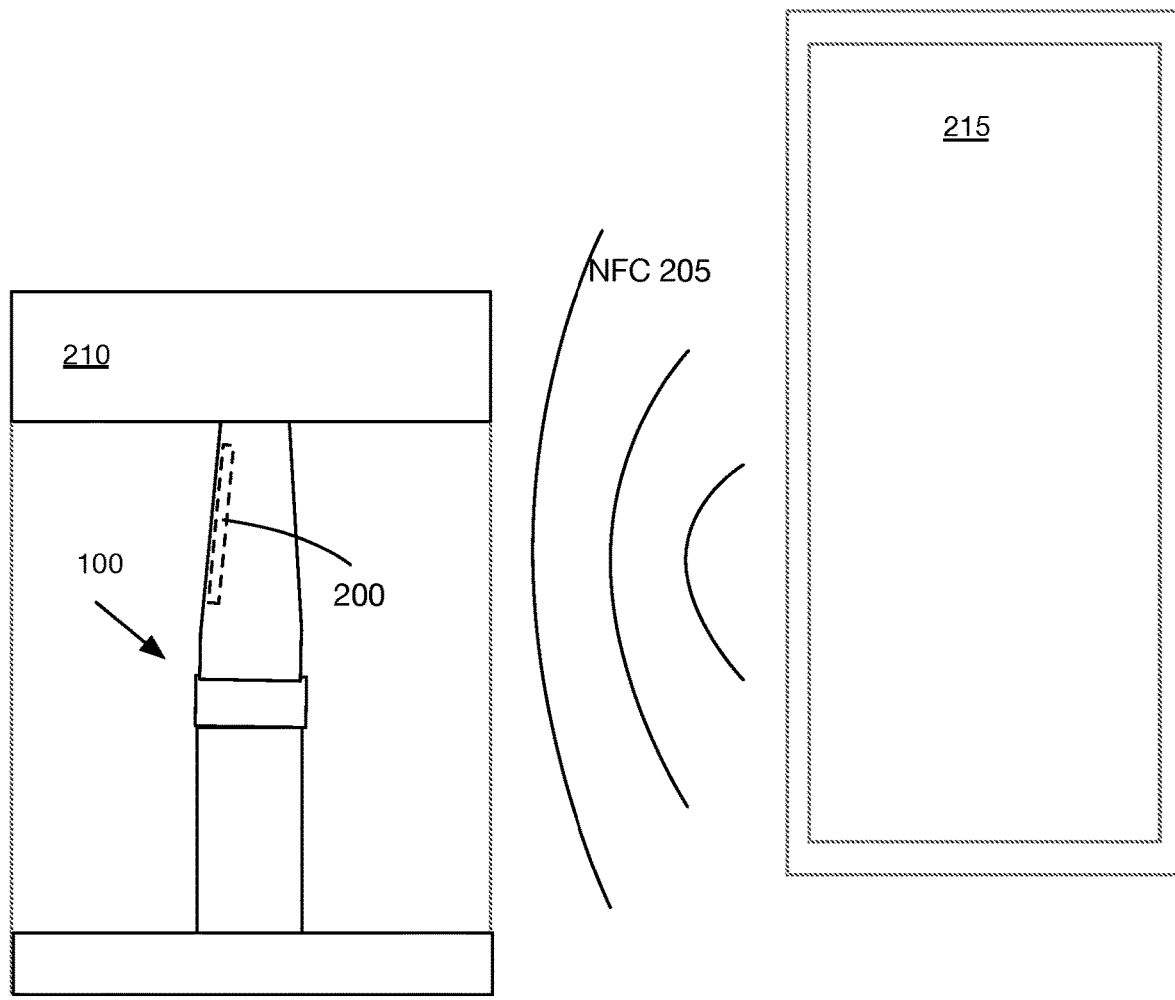
FIG. 5 illustrates a vaporizer cartridge RFID NFC communications.

FIG. 5 illustrates a RFID NFC communication 205 between a computing device 215 and a packaged vaporizer cartridge 210.

Figure 6:
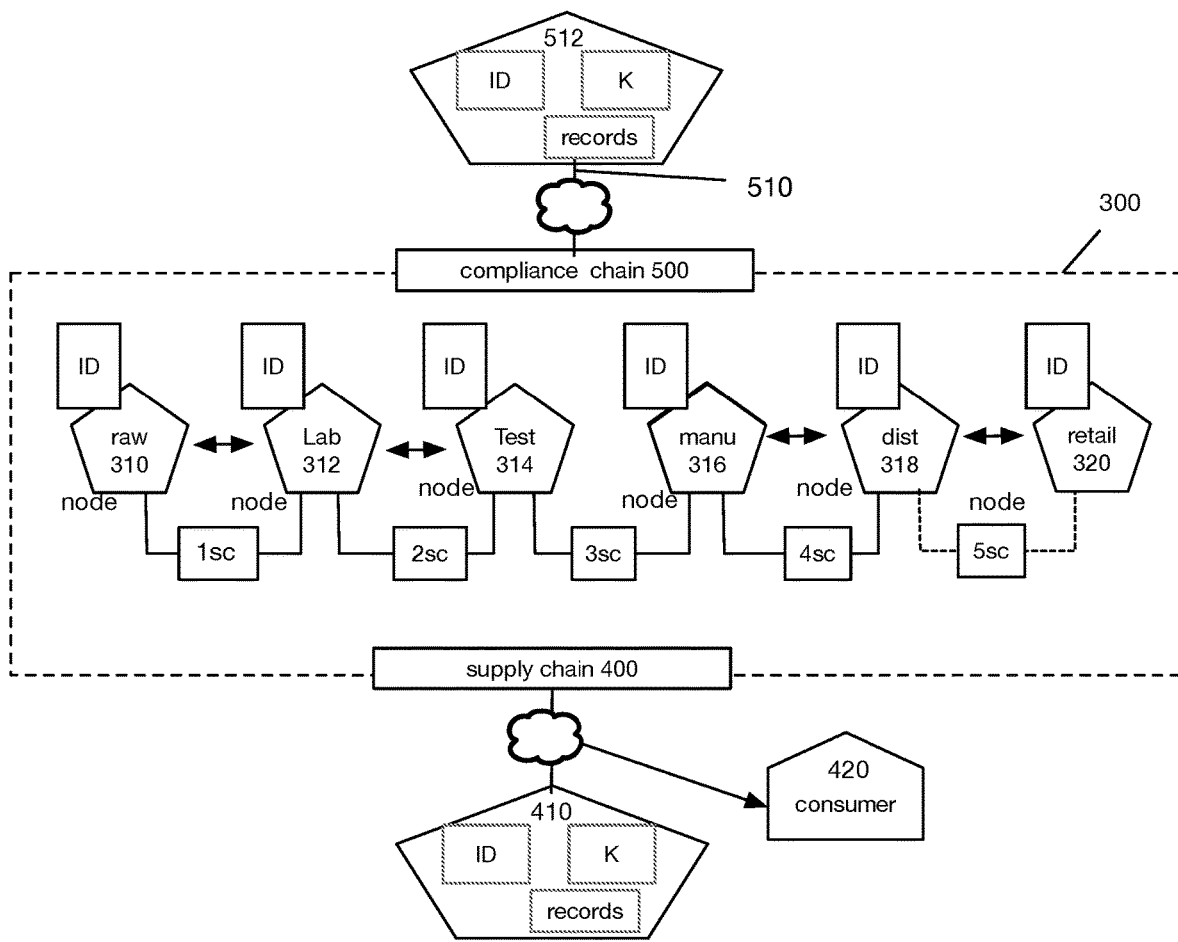
FIGS. 6 and 7 illustrate aspects of method of supply and blockchain for trace and track for vaporizer cartridges disclosed herein.
Figure 7:
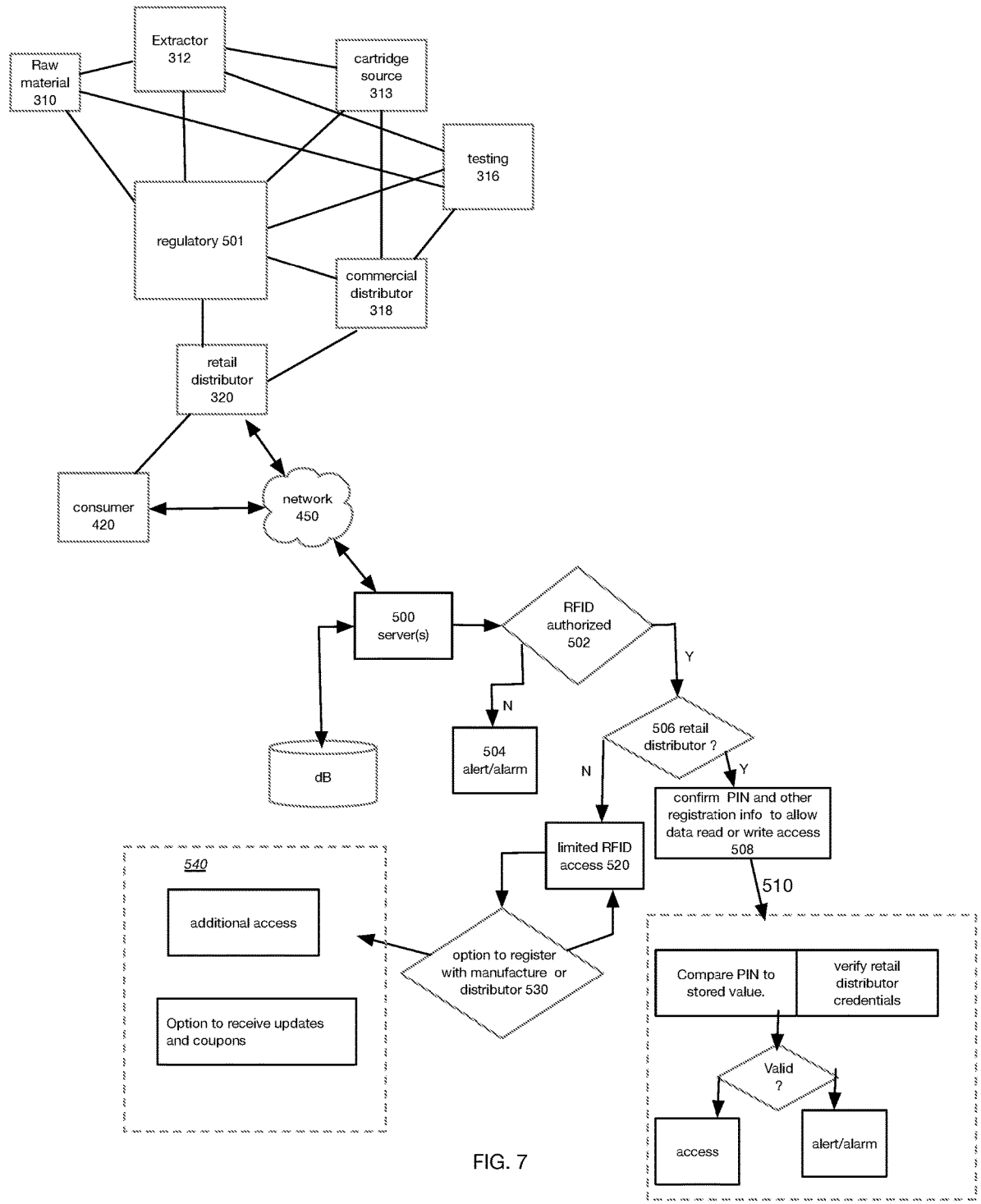

FIGS. 6 and 7 illustrate aspects of method for trace and track for vaporizer cartridges disclosed herein. The blockchain transactions 300 of at least ledger data in an immutable form required, necessary and/or useful information. A blockchain is a type of distributed ledger, comprised of unchangeable, digitally recorded data in packages called blocks (rather like collating them on to a single sheet of paper). Each block is then 'chained' to the next block, using a cryptographic signature. This allows block chains to be used like a ledger, which can be shared and accessed by anyone with the appropriate permissions.

Nodes in a blockchain may also form a consortium blockchain. The nodes include but are not limited to source of raw materials 310, extract laboratory 320, testing laboratory 314, manufacture 316 which may include filling cartridges, boxing and labeling and to distribution 318 and optionally retail 320. The communication between nodes (1sc-5sc) are via signal communication between devices and/or networks.

Each step in the chain is secured through blockchain security and provides each node the compliance data which may be required from governments, insurance and the like to operate a *Cannabis* business and in some instances the credential to add tehri block of data concerning their own activity and compliance requirements. The cartridges with NFC RFID each with its own UIT is capable of read and write transaction for supply chain members (nodes) thereby supporting compliance, preventing fraud and/or protecting the safety of users. All of said data may be used, in some instances, to form a supply chain 400 configured to be in signal communication with retail 410 and/or consumers 420.

A more traditional compliance system 500 is also supported by the blockchain. The governmental entity or insurance entity 510 once verified is configured to receive the blockchain validation to keep records of each cartridge.

At least one of the consumer and the retail distributor may or may not both or be part of the compliance blockchain. Consumer 420 or retail distributor 320 may communicate to the brand manufacture via a network 450. Through the network 450 manufacturer servers 500 proceed to authenticate 502 the RFID communicated. If authentication fails 504 send alarm. Failed authentication sets alarm to investigate tampering, forgery or other non-compliant issue. Brand may contact retail distributor to advise of alarm issue or questionable cartridge credentials to thereby limit returns and helping retailer to identify persons trying to sell or return counterfeit and therefore illegal *Cannabis* products. If authentication is completed 506 resolve of the communication is from consumer 420 or distributor 320. Server requests personal identification number (PIN) from authenticate to determine if retail distributor 508 is properly licensed and legitimate.

An authentication module 510 then proceeds to authenticate/validate the PIN and distributor. If the validation fails alarm is sent. If authenticated access is permitted. If the authorized RFID 502 is not a distributor but is a consumer the consumer is given limited access 520 based on an authentic RFID cartridge. Access may include some of the blockchain information such as extract test data, brand name, date of manufacture, expiration date, terpene profile, and the like. Server gives consumer the option to register 530 with the brand. A registered consumer is allowed access to registered user module which may include additional data on the cartridge contents and supply chain information. Additionally, registered users may opt in to receive electronic coupons and instant coupons for discounted brand products. Coupons may include dispensary specific coupons to direct consumers to properly licensed and registered dispensaries and thereby discourage illegal operations and thereby facilitating compliance with local and other regulations.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method of selectively tracing a vaporizer cartridge, the method comprising: permanently affixing a radio frequency identifier (RFID) that is nearfield communication (NFC) compatible to a vaporizer cartridge; assigning a unique identifier tag (UIT) to the RFID and associated cartridge; and, creating a database which contains at least one of: the safety certification of testing of the cartridge and child safety testing of the cartridge, wherein the safety certification of testing is compliance data.

2. The method of claim 1, wherein the RFID is co-molded with one of the cartridge and the tip of the cartridge.

3. A method of selectively tracing a vaporizer cartridge, the method comprising: permanently affixing a radio frequency identifier (RFID) that is near field communication (NFC) compatible to a vaporizer cartridge; assigning a unique identifier tag (UIT) to the RFID and associated cartridge; and using blockchain ledger between nodes in the supply and distribution chain to chain in their block of data at least compliance data for cartridge safety testing and cartridge child safety.

\* \* \* \* \*